US00RE41208E

(19) United States
(12) Reissued Patent
Lines et al.

(10) Patent Number: US RE41,208 E
(45) Date of Reissued Patent: Apr. 6, 2010

(54) ACID-CAPPED QUATERNIZED POLYMER AND COMPOSITIONS COMPRISING SUCH POLYMER

(75) Inventors: Robert Lines, Sittingbourne (GB); Clayton Price, North Shields (GB)

(73) Assignee: Akzo Nobel N.V., Arnhem (NL)

(21) Appl. No.: 12/031,253

(22) Filed: Feb. 14, 2008

Related U.S. Patent Documents

Reissue of:
(64) Patent No.: 7,001,933
Issued: Feb. 21, 2006
Appl. No.: 10/623,620
Filed: Jul. 22, 2003

(30) Foreign Application Priority Data

Aug. 9, 2002 (EP) ..... 02255612

(51) Int. Cl.
*C09J 201/02* (2006.01)

(52) U.S. Cl. ..... 523/122; 522/177
(58) Field of Classification Search ..... 523/122, 523/177
See application file for complete search history.

(56) References Cited

U.S. PATENT DOCUMENTS

| | | | |
|---|---|---|---|
| 3,320,082 A | 5/1967 | McMahon | |
| 3,522,066 A | 7/1970 | Forsyth | |
| 3,620,784 A | 11/1971 | Schutt | |
| 3,721,574 A | 3/1973 | Schneider et al. | |
| 4,012,437 A | 3/1977 | Shachat et al. | |
| 4,162,169 A | 7/1979 | Schutt | |
| 4,180,643 A | 12/1979 | Moss et al. | |
| 4,212,820 A | 7/1980 | Hotchkiss et al. | |
| 4,230,496 A | 10/1980 | Falcone, Jr. et al. | |
| 4,311,805 A | 1/1982 | Moritani et al. | |
| 4,479,824 A | 10/1984 | Schutt | |
| 4,594,365 A | 6/1986 | Russell et al. | |
| 4,675,051 A | 6/1987 | Baxter | |
| 4,745,214 A | 5/1988 | Hess et al. | |
| 4,791,161 A | 12/1988 | Leising | |
| 4,888,056 A | 12/1989 | van der Kolk et al. | |
| 4,902,442 A | 2/1990 | Garces | |
| 4,910,325 A | 3/1990 | Shen et al. | |
| 4,973,639 A | 11/1990 | Shen et al. | |
| 5,246,488 A | 9/1993 | Tanaka et al. | |
| 5,260,480 A | 11/1993 | Lacroix et al. | |
| 5,700,841 A | 12/1997 | Walker | |
| 6,251,967 B1 | 6/2001 | Perichaud et al. | |
| 6,479,566 B2 * | 11/2002 | Lines et al. | 523/122 |

FOREIGN PATENT DOCUMENTS

| | | |
|---|---|---|
| DE | 38 16 328 | 11/1989 |
| EP | 0 069 559 | 5/1985 |
| EP | 0 291 074 | 11/1988 |
| EP | 0 204 456 | 10/1991 |
| EP | 0 529 693 | 3/1993 |
| EP | 0 663 409 | 7/1995 |
| EP | 0 802 243 | 10/1997 |
| EP | 0 779 304 | 4/2000 |
| GB | 231070 | 3/1925 |
| GB | 751129 | 6/1956 |
| GB | 1 457 590 | 12/1976 |
| GB | 2 273 934 | 7/1994 |
| JP | 02-120372 | 5/1990 |
| JP | 09-202752 | 8/1997 |
| JP | 09-286933 | 11/1997 |
| WO | WO 91/09915 | 7/1991 |
| WO | WO 91/14743 | 10/1991 |
| WO | WO 94/28715 | 12/1994 |
| WO | WO 97/31042 | 8/1997 |
| WO | WO 98/29463 | 7/1998 |
| WO | WO 00/55260 | 9/2000 |
| WO | WO 00/55261 | 9/2000 |
| WO | WO 00/69926 | 11/2000 |
| WO | WO 01/16193 | 3/2001 |
| WO | WO 02/02698 | 1/2002 |
| WO | WO 02/22745 | 3/2002 |
| WO | WO 02/22746 | 3/2002 |

OTHER PUBLICATIONS

International Search Report, International PCT Application No. PCT/EP2003/07693, mailed Nov. 13, 2003.
International Search Report, International PCT Application No. PCT/EP2002/09119, mailed Jan. 27, 2003.

* cited by examiner

*Primary Examiner*—Peter Szekely
(74) *Attorney, Agent, or Firm*—Kenyon & Kenyon LLP

(57) ABSTRACT

The invention relates to a polymer comprising quaternary ammonium and/or quaternary phosphonium groups bound to the backbone of the polymer, said quaternary ammonium groups and/or quaternary phosphonium groups being neutralised by counter-ions, wherein the counter-ions consist of the anionic residue of an acid having an aliphatic, aromatic, or alkaryl hydrocarbon group comprising 6 or more carbon atoms. The invention further relates to the preparation of this polymer, its use in anti-fouling compositions, and to anti-fouling compositions comprising the polymer.

11 Claims, No Drawings

ACID-CAPPED QUATERNIZED POLYMER AND COMPOSITIONS COMPRISING SUCH POLYMER

Matter enclosed in heavy brackets [ ] appears in the original patent but forms no part of this reissue specification; matter printed in italics indicates the additions made by reissue.

*This is a reissue of Ser. No. 10/623,620, now U.S. Pat. No. 7,001,933, filed Jul. 22, 2003.*

This invention relates to anti-fouling paint, especially for marine applications.

Man-made structures such as boat hulls, buoys, drilling platforms, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use anti-fouling paint, for instance as a top coat on ships' hulls, to inhibit the settlement and growth of marine organisms such as barnacles and algae, generally by release of a biocide for the marine organisms.

Traditionally, anti-fouling paints have comprised a relatively inert binder with a biocidal pigment that is leached from the paint. Among the binders which have been used are vinyl resins and rosin. Vinyl resins are seawater-insoluble and paints based on them use a high pigment concentration so as to have contact between the pigment particles to ensure leaching. Rosin is a hard brittle resin that is very slightly soluble in seawater. Rosin-based anti-fouling paints have been referred to as soluble matrix or eroding paints. The biocidal pigment is very gradually leached out of the matrix of rosin binder in use, leaving a skeletal matrix of rosin, which becomes washed off the hull surface to allow leaching of the biocidal pigment from deep within the paint film.

Many successful anti-fouling paints in recent years have been "self-polishing copolymer" paints based on a polymeric binder to which biocidal tri-organotin moieties are chemically bound and from which the biocidal moieties are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB-A-1 457 590. As the use of tri-organotin has been restricted by legislation and will become prohibited world-wide, there is a need for alternative anti-fouling substances that can be used in anti-fouling compositions.

GB-A-2 273 934 described a binder system that is an alternative to organotin-based anti-fouling systems. One of the hydrolysable polymeric binders described comprises quaternary ammonium groups bound to a polymeric backbone. Such a polymeric binder is prepared by co-polymerisation of halide-capped quaternary ammonium monomers of which one of the R groups has a (meth) acrylamide functionality. These polymeric binders are partially soluble in seawater due to the halide-capped quaternary ammonium groups. However, as the whole binder is to some extent seawater-soluble from the start, the paint erodes relatively quickly.

Self-polishing copolymer paints, which release non-biocidal moieties, are described in EP-A-69 559, EP-A-204 456, EP-A-529 693, EP-A-779 304, WO-A-91/14743, WO-A-91/09915, GB-A-231 070, and JP-A-9-286933.

U.S. Pat. No. 4,675,051 describes a marine anti-fouling paint which is gradually dissolved in seawater and which comprises a binder in the form of a resin produced by the reaction of rosin and an aliphatic polyamine containing at least one primary or secondary amine group. EP-A-802 243 describes a coating composition comprising a rosin compound, a polymer containing organisilyl ester groups, and an anti-foulant.

WO-A-02/02698 describes an anti-fouling paint which is gradually dissolved in seawater. The paint comprises a binder and an ingredient having marine biocide properties. The binder comprises a rosin material and an auxiliary film-forming resin. The auxiliary film-forming resin comprises a non-hydrolysing, water-insoluble film-forming polymer and an acid-functional film-forming polymer the acid groups of which are blocked by quaternary ammonium groups or quaternary phosphonium groups. In a first step, the blocking groups are hydrolysed, dissociated or exchanged with seawater species, the polymer framework that remains becoming soluble or dispersible in seawater as a result. In a second step, the soluble or dispersible framework at the surface of the paint layer on the ship is washed out or eroded.

The structure of the quaternary ammonium groups or quaternary phosphonium groups that are used as blocking groups on the acid-functional polymer influences the rate at which the paint dissolves or erodes. Although longer-chain quaternary ammonium groups ensure a slow degradation of the paint, these groups are more toxic with increasing size. This toxicity is for instance used in the mildew-proofing coating composition described in JP-A-2-120372.

Consequently, there is a need for a binder polymer comprising blocked functional groups of which the blocking groups can be hydrolysed, dissociated or exchanged with seawater species, the polymer framework that remains becoming soluble or dispersible in seawater as a result, of which said blocking groups are of low toxicity, preferably non-biocidal.

The present invention relates to a polymer which provides a solution to the above-mentioned problems/disadvantages. The invention further relates to the preparation of this polymer, its use in anti-fouling compositions, to anti-fouling compositions comprising the polymer, and to the use of such anti-fouling compositions for the protection of man-made structures immersed in water such as boat hulls, buoys, drilling platforms, oil production rigs, and pipes.

The binder polymer of the present invention is a polymer comprising quaternary ammonium groups and/or quaternary phosphonium groups bound (pendant) to the backbone of the polymer, said quaternary ammonium groups and/or quaternary phosphonium groups being neutralised, in other words blocked or capped, by counter-ions. These counter-ions consist of the anionic residue of an acid having an aliphatic, aromatic, or alkaryl hydrocarbon group comprising at least 6 carbon atoms.

The present invention further relates to a process for preparing such a long-chain, carboxylate-capped quaternary-functional ammonium or phosphonium polymer, which process comprises the steps of:

Quaternisation of an amine- or phosphine-functional monomer of formula (I):

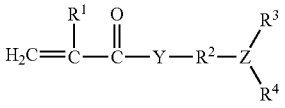

wherein

Y is O or NH, Z is N or P, $R^1$ is a hydrogen atom or a $C_1$–$C_4$ alkyl group, preferably hydrogen or a $C_{1-C2}$ alkyl group.

$R^2$ is a $C_2$ or a $C_{3-C12}$ divalent hydrocarbon group, preferably a $C_2$ or a $C_{3-C8}$ divalent hydrocarbon group, more preferably a $C_2$ or a $C_{3-C4}$ divalent hydrocarbon group.

$R^3$ and $R^4$ independently represent a $C_{1-C6}$ alkyl group, preferably methyl, or an optionally substituted phenyl group.

Replacement of the counter-ion of the quaternised ammonium or phosphonium monomer by a carboxylate group derived from an acid having an aliphatic, aromatic, or alkaryl hydrocarbon group comprising 6 or more carbon atoms. This results in a quaternised monomer that is capped with a counter-ion, wherein the counter-ion consists of the anionic residue of an acid having an aliphatic hydrocarbon group comprising 6 or more carbon atoms.

Polymerisation of at least one type of long-chain acid-capped quaternary ammonium monomer and/or at least one type of long-chain acid-capped quaternary phosphonium-functional monomer.

The quaternisation of an amine- or phosphine-functional monomer of formula (I) can be performed by reacting the monomer (I) with a carbonic acid diester, preferably a carbonic acid diester with up to 6 carbon atoms such as dimethyl carbonate, ethymethyl carbonate, diethyl carbonate, and dipropyl carbonate. Most preferred is a reaction using dimethyl carbonate.

For example, quaternisation of an amine-functional monomer of formula (I) using a carbonic acid diester results in a quaternary ammonium-functional monomer of formula (II):

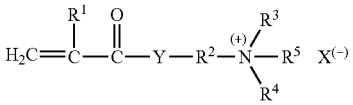

wherein Y, $R^1$, $R^2$, $R^3$, and $R^4$ are as specified above, $R^5$ is a $C_{1-C5}$ alkyl group, preferably $R^5$ is methyl, and X is an anionic residue of the carbonic acid diester. The reaction conditions can be as described in EP-A-291 074 for the quaternisation of a tertiary amine $R^xR^yR^zN$ wherein $R^x$, $R^y$, and $R^z$ represent hydrocarbon residues. For instance, the amine-functional monomer of formula (I) and the carbonic acid diester can be used in a mol ratio of from 0.2 to 5. Normally, the reaction can take place in the presence or absence of a solvent, at a reaction temperature of from 20° C. to 200° C.

Preferably, the reaction is performed at a temperature of from 115° C. to 135° C. in the presence of an alcohol, preferably methanol, under an increased pressure of about 90 psi to 100 psi (6.1 $10^5$ Pa to 6.8 $10^5$ Pa).

The replacement of the carbonate counter-ion of the quaternary ammonium or quaternary phosphonium monomer can be performed using an acid having an aliphatic, aromatic, or alkaryl hydrocarbon group comprising 6 or more carbon atoms. For example, the acid may be a carbonic acid, a sulphonic acid, or a sulphate acid. Preferably, the acid comprises 6 or more carbon atoms, more preferably 8 or more carbon atoms. The acid preferably comprises up to 50 carbon atoms, even more preferably up to 30 carbon atoms, and most preferred up to 20 carbon atoms.

The polymerisation of the long-chain, acid-capped quaternary ammonium- or quaternary phosphonium-functional monomer, or of a mixture of quaternary-functional monomers, can be performed using a variety of co-monomers, optionally mixtures of co-monomers. For example, addition co-polymerisation can be performed with an unsaturated monomer prepared by reacting an ester or amide of an alkyl, alkoxyalkyl, carbocylic or heterocyclic alcohol or amine with an unsaturated carboxylic acid, such as methyl acrylate or methacrylate, butyl acrylate or methacrylate, isobutylacrylate or methacrylate, and isobornyl acrylate or methacrylate. Alternatively, the unsaturated co-monomer can be a vinylic compound, for example styrene, vinyl pyrrolidone or vinyl acetate.

The polymer comprising quaternary ammonium groups and/or quaternary phosphonium groups having counter-ions derived from acids having an aliphatic, aromatic, or alkaryl hydrocarbon group comprising 6 or more carbon atoms can be prepared by polymerisation of at least one type of long-chain, acid-capped quaternary-functional monomer as described above. Alternatively, it can be prepared by reaction of a polymer containing quaternary ammonium groups and/or quaternary phosphonium groups with an acid having an aliphatic, aromatic, or alkaryl hydrocarbon group comprising 6 or more carbon atoms.

The present invention further relates to the use of a polymer comprising quaternary ammonium groups and/or quaternary phosphonium groups bound to the backbone of the polymer, said quaternary ammonium groups and/or quaternary phosphonium groups being neutralised by counter-ions, wherein the counter-ions consist of the anionic residue of an acid having an aliphatic, aromatic, or alkaryl hydrocarbon group comprising 6 or more carbon atoms in anti-fouling coating compositions.

The present invention further relates to anti-fouling coating compositions comprising an ingredient having marine biocidal properties and a polymer comprising quaternary ammonium groups and/or quaternary phosphonium groups bound to the backbone of the polymer, said quaternary ammonium groups and/or quaternary phosphonium groups being neutralised by counter-ions, wherein the counter-ions consist of the anionic residue of an acid having an aliphatic, aromatic, or alkaryl hydrocarbon group comprising 6 or more carbon atoms.

The rate at which the paint according to the current invention dissolves or erodes in seawater can be adjusted by the structure of the blocking groups, substantially without problems related to the toxicity of the released groups. Preferably, the blocking groups comprise anionic residues of one or more acids having an aliphatic hydrocarbon group comprising 6 to 50 carbon atoms, more preferably 6 to 20 carbon atoms.

According to another embodiment of the invention, the paint comprises a rosin material in addition to the ingredient having marine biocidal properties and the polymer comprising quaternary ammonium groups and/or quaternary phosphonium groups, said quaternary ammonium groups and/or quaternary phosphonium groups being neutralised by counter-ions consisting of the anionic residue of an acid having an aliphatic, aromatic, or alkaryl hydrocarbon group comprising 6 or more carbon atoms.

Rosin is not a very good film former, and it is known to add other film-forming resins to rosin-based anti-fouling paints. Consequently, an anti-fouling coating composition according to the present invention comprising a rosin material preferably additionally comprises a non-hydrolysing, water-insoluble film-forming polymer. The ratio between the rosin material and the long-chain, acid-capped quaternary-functional polymer, and optionally one or more other film-forming resins, influences the strength of the paint film and/or the reliable eroding of the rosin-based paint matrix after the ingredient having marine biocidal properties has been leached from the paint.

According to a preferred embodiment of the invention, the anti-fouling paint has a binder comprising a blend of a rosin material and an auxiliary film-forming resin in a weight ratio of 20:80 to 95:5, the auxiliary film-forming resin comprising 20–100% by weight of the total weight of the auxiliary film-forming resin of a quaternary ammonium- and/or quaternary phosphonium-functional film-forming polymer (A), the quaternised groups of which are blocked by groups capable of hydrolyzing, dissociating or exchanging with seawater species to leave a polymer soluble in seawater, the blocking groups being anionic residues of acids having an aliphatic, aromatic, or alkaryl hydrocarbon group comprising 6 or more carbon atoms, and 80–0% by weight of the total weight of the auxiliary film-forming resin of a non-hydrolysing, water-insoluble film-forming polymer (B).

The rosin material, which can be added to a composition comprising a ingredient having marine biocidal properties and a long-chain, acid-capped quaternary-functional polymer, preferably is rosin, more particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formulated rosin or polymerised rosin, or a rosin metal salt such as calcium, magnesium, copper or zinc rosinate.

The non-hydrolysing, water-insoluble film-forming polymer (B) can for example be a vinyl ether polymer, for example a poly(vinyl alkyl ether) or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, or a vinyl acetate polymer such as polyvinyl acetate or a vinyl acetate vinyl chloride copolymer. Polymer (B) can alternatively be a polyamine, particularly a polyamide having a plasticising effect such as a polyamide of a fatty acid dimer or the polyamide sold under the Trademark "Santiciser".

We have found that the paints of the invention have the optimum combination of film-forming and eroding properties when the non-hydrolysing, water insoluble film-forming polymer (B) is present in the composition. Most preferably, the weight ratio of rosin to total auxiliary film-forming resin is from 25:75, 50:50 or 55:45 up to 80:20. The hydrolysing or dissociating film-forming polymer (A) preferably forms at least 30, most preferably at least 50, up to 80 or 90% by weight of the auxiliary film-forming resin, the non-hydrolysing water-insoluble polymer (B) being the remainder.

The rosin and the polymers forming the auxiliary film-forming resin can be mixed in a common solvent which forms at least part of the paint solvent, for example, an aromatic hydrocarbon such as xylene, toluene or trimethylbenzene, an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, or a mixture of two or more of these solvents.

An anti-fouling paint according to the present invention, either with or without rosin, can include a non-polymeric plasticizer. Such a plasticiser can for example be present at up to 50% by weight based on the total binder polymer, most preferably at at least 10% and up to 35% by weight based on the binder polymer. Examples of such plasticisers are phthalate esters such as dibutyl phthalate, butyl benzyl phthalate or dioctyl phthalate, phosphate triesters such as tricresyl or tris(isopropyl)phenyl phosphate, or chlorinated paraffins.

The ingredient having marine biocidal properties usually is a biocide for aquatic organisms or a pigment, or a mixture thereof. This biocide and/or pigment can be mixed with the binder using conventional paint-blending techniques. When the ingredient having marine biocidal properties is a pigment, it can be all or part of the pigment of the paint. The coating composition preferably has a pigment volume concentration of, for example, 15 to 55%.

When the ingredient having marine biocidal properties is a pigment, the pigment can comprise a metalliferous pigment, for example a metalliferous pigment having a solubility in seawater of from 0.5 to 10 parts per million by weight. Examples of such pigments which also behave as aquatic biocides include copper or zinc compounds, such as cuprous oxide, cuprous thiocyanate, cuprous sulphate, zinc ethylene bis(dithiocarbamate), zinc dimethyl dithiocarbamate, zinc pyrithione, copper pyrithione, zinc diethyl dithio-carbamate, copper resinate or cuprous ethylene bis (dithio-carbamate). Other sparingly soluble pigments having a solubility in seawater of 0.5 to 10 parts per million include barium sulphate, calcium sulphate, dolomite, and zinc oxide. Mixtures of sparingly soluble pigments can be used; for example cuprous oxide, suprous thiocyanate or zinc ethylene bis(dithiocarbamate), which are highly effective biocidal pigments, can be mixed with zinc oxide, which is not effective as a biocide but dissolves slightly more rapidly in seawater. Copper metal can be present as an aquatic biocide, for example in the flake or powder form.

The anti-fouling coating composition can contain a non-metalliferous biocide for marine organisms, i.e. an ingredient having marine biocidal properties that is a biocide, but not a pigment. Examples of such compounds are tetramethyl thiuram disulphide, methylene bis(thiocyanate), captan, pyridinium triphenylboron, a substituted isothiazolone such as 4,5-dichloro-2-n-octyl-4-isothiazolin-3-one, 2-methylthio-4-t.butylamino-6-cyclopropylamino-s-triazine, N-3,4-dichlorophenyl-N',N'-dimethyl-urea ("Diuron"), 2-(thiocyanomethylthio)benzothiazole, 2,4,5,6-tetrachloroisophthalonitrile, dichlorofluanid, tolylfluanid, 2-(p-chlorophenyl)-3-cyano-4-bromo-5-trifluoromethylpyrrole, 3-butyl-5-(dibromomethylidene)-2(5H)-furanone and 2,3,5,6-tetrachloro-4-(methyl-sulphonyl) pyridine. Such a non-metalliferous biocide can be used as the only biocide of the coating in a copper-free, or even metal-free or pigment-free, anti-fouling coating.

Optionally, the anti-fouling composition comprises one or more acid-functional biocides, for example, (9E)-4-(6,10-dimethylocta-9,11-dienyl) furan-2-carboxylic acid and p-(sulphooxy) cinnamic acid (zosteric acid). Such a (mixture of) non-metalliferous acid-functional biocide(s) can be used as the only biocide of the coating in a copper-free, or even metal-free or pigment-free, anti-fouling coating.

In addition to the ingredient having marine biocidal properties, which usually is a biocide for aquatic organisms or a pigment or a mixture thereof, the coating composition can contain (other) pigments. For instance pigments which are not reactive with seawater and may be highly insoluble in seawater (solubility below 0.5 part per million by weight), such as titanium dioxide or ferric oxide or an organic pigment such as phthalocyanine or azo pigment. Such highly insoluble pigments are preferably used at less than 60% by weight of the total pigment component of the paint, most preferably less than 40%.

The coating composition can additionally contain other additives, for instance conventional thickeners, particularly thixotropes such as silica or bentonite and/or stabilisers, for example zeolites or aliphatic or aromatic amines such as dehydroabietylamine.

The invention will be elucidated with reference to the following examples. These are intended to illustrate the invention but are not to be construed as limiting in any manner the scope thereof.

EXAMPLE 1

The methyl carbonate salt of trimethylammonium propylmethacrylamide was neutralised using palmitic acid in the following way.

Solid palmitic acid (60.26 g, 0.235 mole) was added to a mathanolic solution (300 ml) of trimethylammonium propylmethacrylamide methylcarbonate salt (61.18 g, 0.235 mole). The bubbling suspension ($CO_2$ gas evolved) was stirred overnight at room temperature under an atmosphere of $N_2$. The resultant solution was heated to 35° C. for a further hour to ensure complete reaction. Evaporative removal of the solvent under reduced pressure, yielded an off-white solid/semi-solid that was confirmed to be the desired product by $^1$H-NMR and used without further purification.

The above-described experiment was performed under the conditions routinely employed for this reaction. Variations on these reaction conditions are possible. For example, alternate solvents such as ethanol, propanol, isopropanol, butanol, or blends of these with xylene, can be employed to yield a monomer solution which can be carried forward directly (without isolation) to the polymerisation step. In addition, the reaction can be carried out at elevated temperatures for shorter time periods.

EXAMPLE 2

The trimethylammonium propylmethacrylamide palmitate salt prepared in Example 1 was polymerised with isobornylmethacrylate (iBoMA) (20:80) such that a 50% solids polymer solution was obtained.

A feed solution was prepared comprising trimethylammonium propylmethacrylamide palmitate (103.57 g, 0.235 mole) in (3:1) xylene:butanol (50 g), iBoMA (208.96 g, 0.940 mole), and 2,2'-azobis-(2-methylbutyronitrile) AMBN initiator (2.26 g, 0.118 mole, 1 mol %). This feed solution was added dropwise over 3 ½ h, with mechanical stirring and under an atmosphere of $N_2$, to a reaction vessel containing (3:1) xylene:butanol (265 g) at 85° C. After the monomer addition was complete, the temperature was raised to 95° C. and a booster amount of AMBN (1.13 g, 0.0059 mole, ½ mol %) was added. The reaction was maintained at this elevated temperature for 1 h. The polymer solution was transferred to a storage vessel on cooling.

The above-described experiment was performed under the conditions routinely employed for this reaction, although variations on these conditions are possible. Other solvents or solvent blends comprised of common paint solvents can be used as alternatives. Other co-monomers are, for example, methyl (meth)acrylate, butyl (meth)acrylate, isobutyl (meth) acrylate, styrene, and other vinylic monomers. Also the ratio of monomers can be changed. Usually, the quaternary-functional acid-capped monomer will be present in an amount of 15 to 30 mol %. The viscosities of the polymer solutions are such that materials can usually be formulated at percentage solids for example above 30%, or above 45%, and, for example, below 75%. In addition, alternative initiators such as α,α'-azoisobutyronitrile (AIBN), can be used.

EXAMPLE 3

The following materials were mixed in the stated % by weight using a high-speed disperser to form copper containing anti-fouling paints according to the invention.

| Name | Description | Dry Film Vol. | Wt % |
|---|---|---|---|
| Palmitate-capped Resin | Resin solution | 21.61 | 16.37 |
| Hydroquinone | Inhibitor | 0.24 | 0.10 |
| Tixogel MP ® | Organoclay gellant | 2.42 | 1.36 |
| Silica-Wacker HDK-N20 ® | Thixotrope | 1.47 | 1.01 |
| Xylene | Solvent | — | 3.05 |
| Hansa-Scarlet RN-C ® | Pigment | 5.10 | 2.27 |
| Copper Omadine ® | Biocide | 6.77 | 3.89 |
| Zinc Oxide | Pigment | 6.76 | 11.63 |
| Cuprous Oxide | Biocide | 20.25 | 36.73 |
| Lutonal A25 ® (polyvinyl ethyl ether) | Plasticiser | 11.93 | 3.54 |
| Methyl iso-amyl ketone | Solvent | — | 2.27 |

EXAMPLE 4

The following materials were mixed in the stated % by weight using a high-speed disperser to form copper-free anti-fouling paints according to the invention.

| Name | Description | Dry Film Vol | Wt % |
|---|---|---|---|
| Palmitate-capped Resin | Resin solution | 43.24 | 36.29 |
| Xylene | Solvent | — | 5.09 |
| Bentone SD1 ® | Organoclay gellant | 1.01 | 0.52 |
| Silica-Wacker HDK-N20 ® | Thixotrope | 0.68 | 0.52 |
| Anti-Terra 203 ® | Dispersant | 0.76 | 0.46 |
| Irgarol 1051 ® | Biocide | 12.94 | 4.93 |
| Zinc Oxide | Pigment | 21.45 | 40.88 |
| Zinc Omadine ® | Biocide | 6.33 | 3.91 |
| Lutonal A25 ® (polyvinyl ethyl ether) | Plasticiser | 10.81 | 3.56 |
| Titanium dioxide (Rutile) | Pigment | 2.77 | 3.84 |

EXAMPLE 5

The following materials were mixed in the stated % by weight using a high-speed disperser to form zinc- and copper-free anti-fouling paints according to the invention.

| Name | Description | Dry Film Vol | Wt % |
|---|---|---|---|
| Palmitate-capped Resin | Resin solution | 34.61 | 28.87 |
| Xylene | Solvent | — | 4.63 |
| Tixogel MP ® | Organoclay gellant | 1.43 | 1.01 |
| Silica-Wacker HDK-N20 ® | Thixotrope | 0.35 | 0.30 |
| Sea-Nine 211 ® | Biocide | 6.89 | 9.94 |
| Preventol A5 ® | Biocide | 8.69 | 5.12 |
| Iron Oxide (Bayferrox) Red 130BM ® | Pigment | 3.32 | 6.53 |
| Lutonal A25 ® (polyvinyl ethyl ether) | Plasticiser | 8.65 | 3.23 |
| Dolomite Microdol H extra ® | Filler | 36.06 | 40.36 |

The invention claimed is:

1. A sea water-insoluble polymer comprising quaternary ammonium groups and/or quaternary phosphonium groups bound to a backbone of the polymer comprising a group of formula:

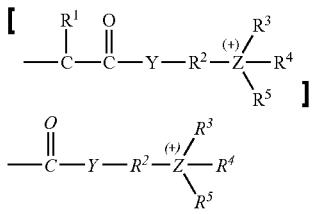

wherein

Y is O or NH, Z is N or P, [$R^1$ is a hydrogen atom or a $C_1$–$C_4$ alkyl group,]

$R^2$ is a $C_2$ or a $C_3$–$C_{12}$ divalent hydrocarbon group, $R^3$ and $R^4$ independently represent a $C_1$–$C_6$ alkyl group, $R^5$ is a $C_1$–$C_5$ alkyl group, said quaternary ammonium groups and/or quaternary phosphonium groups being neutralised by counter-ions that consist of the anionic residue of an acid having an aliphatic, aromatic, or alkaryl hydrocarbon group comprising 6 or more carbon atoms;

said counter-ions being capable of hydrolyzing, dissociating or exchanging with sea water species to leave a polymer framework that is soluble in sea water.

2. Process for the preparation of a sea water-insoluble polymer comprising quaternary ammonium groups and/or quaternary phosphonium groups bound to the backbone of the polymer, comprising the steps of:

quaternary an amine- or phosphine-functional monomer of formula (I):

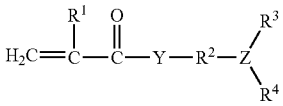

wherein Y is O or NH, Z is N or P, $R^1$ is a hydrogen atom or a $C_1$–$C_4$ alkyl group, $R^2$ is a $C_2$ or a $C_3$–$C_{12}$ alkylene group, $R^3$ and $R^4$ independently represent a $C_1$–$C_6$ alkylene group or an optionally substituted phenyl group, replacing a counter-ion of the quaternised ammonium or phosphonium monomer by a carboxylic group derived from an acid having an aliphatic, aromatic, or alkaryl hydrocarbon group comprising 6 or more carbon atoms and polymerizing at least one type of long-chain acid-capped quaternary ammonium monomer and/or at least one type of long-chain, acid-capped quaternary phosphonium-functional monomer;

wherein said counter-ions being capable of hydrolyzing, dissociating or exchanging with sea water species to leave a polymer framework that is soluble in sea water.

3. Anti-fouling coating compositions comprising an ingredient having marine biocidal properties and a sea water-insoluble polymer comprising quaternary ammonium groups and/or quaternary phosphonium groups bound to a backbone of the polymer comprising a group of formula:

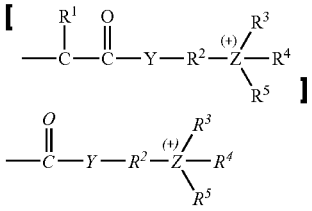

wherein

Y is O or NH, Z is N or P, [$R^1$ is a hydrogen atom or a $C_1$–$C_4$ alkyl group,]

$R^2$ is a $C_2$ or a $C_3$–$C_{12}$ divalent hydrocarbon group, $R^3$ and $R^4$ independently represent a $C_1$–$C_6$ alkyl group, $R^5$ is a $C_1$–$C_5$ alkyl group, said quaternary ammonium groups and/or quaternary phosphonium groups being neutralised by counter-ions that consist of the anionic residue of an acid having an aliphatic, aromatic, or alkaryl hydrocarbon group comprising 6 or more carbon atoms;

said counter-ions being capable of hydrolyzing, dissociating or exchanging with sea water species to leave a polymer framework that is soluble in sea water.

4. Coating composition according to claim 3, characterized in that the counter-ions comprise 6 to 50 carbon atoms.

5. Coating composition according to claim 3, characterized in that the coating composition additionally comprises a rosin material.

6. Coating composition according to claim 5, characterised in that the coating composition has a binder comprising a blend of a rosin material and an auxiliary film-forming resin in a weight ratio of 20:80 to 95:5, the auxiliary film-forming resin comprising 20–100% by weight of the total weight of the auxiliary film-forming resin of a quaternary ammonium- and/or quaternary phosphonium-functional film-forming polymer (A), the quaternised groups of which are blocked by groups capable of hydrolysing, dissociating or exchanging with seawater species to leave a polymer soluble in seawater, the blocking groups being anionic residues of acids having an aliphatic, aromatic, or alkaryl hydrocarbon group comprising 6 or more carbon atoms, and 80–0% by weight of the total weight of the auxiliary film-forming resin of a non-hydrolysing, water-insoluble film-forming polymer (B).

7. Coating composition according to claim 6, characterised in that the binder comprises a blend of the rosin material and the auxiliary film-forming resin in a weight ratio of 55:45 to 80:20.

8. Coating composition according to claim 6, characterised in that the auxiliary film-forming resin comprises 30–90% by weight of the film-forming polymer (A) capable of hydrolysing or dissociating to a polymer soluble in sea water and 70–10% by weight of the non-hydrolysing, water-insoluble film-forming polymer (B).

9. Coating composition according to claim 6, characterised in that the non-hydrolysing, water-insoluble film-forming polymer (B) is an acrylate ester polymer or a vinyl ether polymer.

10. Coating composition according to claim 3, characterised in that the binder includes a non-polymeric plasticiser present at up to 50% by weight based on the total binder polymer.

11. Method of coating man-made structures immersed in water, comprising coating said structures with the composition of claim 3.

* * * * *